UNITED STATES PATENT OFFICE.

GUY L. NOBLE, OF CHICAGO, ILLINOIS, ASSIGNOR TO ARMOUR AND COMPANY, OF CHICAGO, ILLINOIS, A CORPORATION OF ILLINOIS.

ACTIVATED-SLUDGE TREATMENT.

1,254,841.  Specification of Letters Patent.  Patented Jan. 29, 1918.

No Drawing.  Application filed July 9, 1917.  Serial No. 179,456.

*To all whom it may concern:*

Be it known that I, GUY L. NOBLE, a citizen of the United States, residing at Chicago, in the county of Cook and State of Illinois, have invented certain new and useful Improvements in Activated-Sludge Treatment, of which the following is a specification.

The activated sludge method of sewage disposal, though of comparatively modern origin and in its infancy, is one which is well known and constitutes a field of activity for sanitary engineers in the effort to surmount present difficulties in its application to a wider range of usefulness and in experimentation to increase its efficiency and economical availability.

Briefly and generally stated, the activated sludge treatment of sewage consists in conducting the raw sewage into and through aerating tanks provided with means for the introduction of air under pressure to the bottom of the tank, whereby the air is caused to bubble up through the liquid sewage. The passage of the air through the sewage develops in time microscopic aerobic organisms which in the course of their growth or by means of conditions provided by their growth, oxidize the colloidal and soluble solids in the sewage causing them to separate out as flocculent particles. The treated sewage, at the proper stage is run into a settling tank where it is allowed to remain quiescent for from thirty minutes to one hour, and the solids settle to the bottom as a flocculent ooze, called activated sludge.

The remaining liquid content of the sewage is rendered perfectly clear, white and odorless. This effluent liquid may then be run off through the sewers to rivers or other natural channels without injury to fish or menace to the health or comfort of people living adjacent thereto.

The activated sludge is removed from the bottom of the tank, to be freed of its water content, and when dried is available as a fertilizer, containing a large percentage of ammonia compounds and being practically free from any offensive odors.

To make the process continuous and in order to hasten the treatment of the raw sewage, it is found advantageous to inoculate the same upon its introduction to the aerating tanks with activated sludge from sewage previously treated, whereby the process is reduced in point of time from several days to a few hours.

I have discovered that during the settling process, by which is obtained the activated sludge used in the inoculation of the fresh sewage, there is a second development of anaerobic organisms and a deterioration in the virility of the aerobic organisms due to the necessary cessation of the air supply while settling is taking place whereby its inoculating efficiency is reduced.

I have discovered that the number and virility of the aerobic organisms in the activated sludge, and its consequent value as an inoculating medium, are greatly increased by a further aeration of the sludge subsequent to its withdrawal from the settling chamber and previous to its introduction to the raw sewage, the best results being obtained by aerating the same for a period of about three hours.

I claim:

1. The improvement in the activated sludge method of treatment as applied to sewage, which consists in drawing off the activated sludge from previously treated sewage, aerating such sludge after its withdrawal to enhance the virility of the aerobic organisms therein, and inoculating the raw sewage with such re-vitalized sludge.

2. The improvement in the activated sludge method of treatment as applied to sewage, which consists in drawing off the activated sludge from previously treated sewage, aerating such sludge for a period of about three hours after its withdrawal to enhance the virility of the aerobic organisms therein, and inoculating the raw sewage with such re-vitalized sludge.

In testimony whereof I have hereunto signed my name in the presence of two subscribing witnesses.

GUY L. NOBLE.

Witnesses:
A. B. S. WALTON,
E. G. McDONALD.